(12) United States Patent
Li

(10) Patent No.: US 12,377,894 B1
(45) Date of Patent: Aug. 5, 2025

(54) MULTIFUNCTIONAL HANDCART

(71) Applicant: Dongyang Li, Shandong (CN)

(72) Inventor: Dongyang Li, Shandong (CN)

(*) Notice: Subject to any disclaimer, the term of this patent is extended or adjusted under 35 U.S.C. 154(b) by 0 days.

(21) Appl. No.: 19/214,718

(22) Filed: May 21, 2025

(30) Foreign Application Priority Data

Apr. 18, 2025 (CN) .......................... 202520762685.7

(51) Int. Cl.
B62B 3/00 (2006.01)
B62B 3/04 (2006.01)
B62B 5/04 (2006.01)

(52) U.S. Cl.
CPC ................ *B62B 3/007* (2013.01); *B62B 3/04* (2013.01); *B62B 5/0414* (2013.01); *B62B 5/0447* (2013.01); *B62B 5/049* (2013.01)

(58) Field of Classification Search
None
See application file for complete search history.

(56) References Cited

U.S. PATENT DOCUMENTS

| | | | | |
|---|---|---|---|---|
| 2,720,989 A * | 10/1955 | Wormser | .................. | B62B 3/04 |
| | | | | 193/35 MD |
| 6,508,479 B1 * | 1/2003 | Tseng | .................... | B62B 5/0442 |
| | | | | 280/47.11 |
| 6,962,370 B2 * | 11/2005 | Simpson | .............. | B62D 63/061 |
| | | | | 280/789 |
| 7,887,141 B2 * | 2/2011 | Pieschel | .................... | B62B 3/08 |
| | | | | 298/17.8 |
| 9,259,134 B1 * | 2/2016 | Feik | ........................ | A47L 13/58 |
| 9,809,241 B2 * | 11/2017 | Polidoros | ................ | B62B 3/108 |
| 10,829,137 B2 * | 11/2020 | Kramer | ..................... | B62B 3/02 |
| 11,117,604 B2 * | 9/2021 | Kramer | ................... | B63B 32/80 |
| 11,299,187 B2 * | 4/2022 | Foley | ........................ | B62B 3/08 |
| 11,370,467 B1 * | 6/2022 | Horowitz | ................ | B62B 3/007 |
| 11,851,097 B2 * | 12/2023 | Chu | ........................ | B62B 3/007 |
| 11,878,726 B2 * | 1/2024 | Shibata | ..................... | B62B 3/08 |
| 2003/0218316 A1 * | 11/2003 | Simpson | .............. | B62D 63/061 |
| | | | | 280/656 |
| 2004/0164512 A1 * | 8/2004 | Gunter | .................... | B62B 3/001 |
| | | | | 280/87.021 |

(Continued)

FOREIGN PATENT DOCUMENTS

CN 211617788 U * 10/2020
CN 212828587 U * 3/2021

(Continued)

*Primary Examiner* — James A Shriver, II
*Assistant Examiner* — Ian Bryce Shelton
(74) *Attorney, Agent, or Firm* — Ricky Lam

(57) ABSTRACT

Disclosed is a novel multifunctional handcart comprises a load platform, wherein: a rear wheel is fixedly connected to the bottom of the load platform; a front wheel is fixedly connected to the bottom of the load platform; a guardrail is rotatably connected to a side wall of the load platform; a buckle is provided on a sidewall of the guardrail; a parking latch is rotatably connected inside the front wheel; a connecting piece is rotatably connected inside the front wheel; a handle is fixedly connected to one end of the connecting piece; a parking base is fixedly connected to a lower surface of the connecting piece; a telescopic rod is provided on a sidewall of the load platform; and a lap plate is provided on a sidewall of the telescopic rod.

6 Claims, 4 Drawing Sheets

(56) References Cited

U.S. PATENT DOCUMENTS

| | | | | |
|---|---|---|---|---|
| 2005/0275179 | A1* | 12/2005 | Whittington | B62B 5/0442 |
| | | | | 280/79.11 |
| 2007/0200419 | A1* | 8/2007 | Pieschel | B62B 3/08 |
| | | | | 298/2 |
| 2010/0310346 | A1* | 12/2010 | Polidoros | B62B 3/108 |
| | | | | 280/79.7 |
| 2014/0334910 | A1* | 11/2014 | Raasch | B62B 5/049 |
| | | | | 414/800 |
| 2017/0225017 | A1* | 8/2017 | Johanneck | A62B 35/0068 |
| 2019/0084602 | A1* | 3/2019 | Ribbe | B62B 3/004 |
| 2020/0023877 | A1* | 1/2020 | Kramer | B62B 3/007 |
| 2020/0247447 | A1* | 8/2020 | Foley | B62B 3/007 |
| 2021/0002919 | A1* | 1/2021 | Camillo | B62B 5/0013 |
| 2021/0009178 | A1* | 1/2021 | Kramer | B62B 3/007 |
| 2022/0396299 | A1* | 12/2022 | Chu | B62B 3/02 |
| 2023/0094718 | A1* | 3/2023 | Zhou | B62B 3/025 |
| | | | | 280/651 |
| 2024/0010257 | A1* | 1/2024 | Moore | B62B 3/08 |
| 2024/0010259 | A1* | 1/2024 | Luo | B62B 3/007 |
| 2024/0190490 | A1* | 6/2024 | Thomas | B62B 3/02 |
| 2024/0190492 | A1* | 6/2024 | Frankel | B62B 3/007 |
| 2024/0300561 | A1* | 9/2024 | Zhang | B62B 3/002 |
| 2025/0018989 | A1* | 1/2025 | Zhang | B62B 3/002 |
| 2025/0065934 | A1* | 2/2025 | Zhang | B62B 3/007 |
| 2025/0083724 | A1* | 3/2025 | Sun | B62B 5/065 |

FOREIGN PATENT DOCUMENTS

| | | | | |
|---|---|---|---|---|
| CN | 113147854 | A * | 7/2021 | B62B 5/0003 |
| CN | 114194275 | A * | 3/2022 | B62B 5/0447 |
| CN | 114426056 | A * | 5/2022 | B62B 5/00 |
| DE | 202021101462 | U1 * | 6/2021 | B62B 3/022 |
| DE | 202022001372 | U1 * | 7/2022 | B62B 3/1476 |
| FR | 3114791 | A1 * | 4/2022 | B62B 5/0079 |

\* cited by examiner

MULTIFUNCTIONAL HANDCART

CLAIMS OF PRIORITY

This patent application claims priority from:
(1) CN utility model patent application number is 2025207626857 with a filing date of Apr. 18, 2025 and DAS code of 96F4.

FIELD

The present disclosure relates to handcarts, and more particularly to a novel multifunctional handcart.

BACKGROUND

In today's fast-paced life and busy logistics operations, handcarts serve as a fundamental and practical transport apparatus, playing an indispensable role in various settings. From rapid transfer of goods in large warehouses to daily restocking in small stores, and even to short-distance movement of household items, people's expectations for their multifunctionality and ease of operation continue to rise. Therefore, developing a novel handcart that integrates multiple practical functions to meet complex and changing transport needs has become an urgent demand in the industry.

Most existing handcarts adopt a relatively simple mechanical structure, typically consisting of a load platform of a fixed shape and size coupled with several wheels. During operation, the user grips a handle connected to the load platform and realizes the transport of items by leveraging wheel rotation. The working principle primarily depends on basic lever mechanics and rolling friction, resulting in a relatively simple structure with limited functionality.

However, during practical use, when a user needs to temporarily park an existing handcart, due to the lack of an effective parking mechanism, the handcart is prone to slide on inclined surfaces or when subjected to an external force, causing goods to fall off and be damaged. At the same time, it is impossible to cooperate with trucks or private vehicles for loading, unloading, transferring or transporting purposes. Therefore, a multifunctional novel handcart is proposed to address these issues.

SUMMARY

To overcome the above shortcomings, the present disclosure provides a novel multifunctional handcart, aiming to address the problems of parking inability, potential safety hazards, and incompatibility with trucks or private vehicles for loading, unloading, transferring or transporting purposes.

To fulfill the above objects, the present disclosure adopts technical solutions as follows.

A novel multifunctional handcart comprises a load platform, wherein: a rear wheel is fixedly connected to the bottom of the load platform; a front wheel is fixedly connected to the bottom of the load platform; a guardrail is rotatably connected to a side wall of the load platform; a buckle is provided on a sidewall of the guardrail; a parking latch is rotatably connected inside the front wheel; a connecting piece is rotatably connected inside the front wheel; a handle is fixedly connected to one end of the connecting piece; a parking base is fixedly connected to a lower surface of the connecting piece; a telescopic rod is provided on a sidewall of the load platform; and a lap plate is provided on a sidewall of the telescopic rod.

As a further technical solution, the telescopic rod is slidably connected inside the rear guardrail, and the lap plate is rotatably connected to the side wall of the telescopic rod.

As a further technical solution, the guardrail is arranged around an edge of the load platform and connected to an adjacent guardrail via a buckle.

As a further technical solution, when the parking latch rotates, its inner wall fits against a side wall of the connecting piece, thereby locking the connecting piece and preventing shaking.

As a further technical solution, the telescopic rod cooperates with the lap plate to connect to an empty space on a vehicle and form a platform, facilitating the handling of objects.

As a further technical solution, the connecting piece is tubular and is configured to connect the handle and the parking base.

The present disclosure offers the following beneficial effects.

In the present disclosure, the assembly of the apparatus is facilitated by rotating the guardrails and connecting them via buckles. Pulling the handle allows the cart to be moved, while releasing the handle causes the parking base to contact the ground, completing a parking action. When the handle is released, the parking latch can be manually locked, such that the cart can be parked more stably. The cooperation between the telescopic rod and the lap plate facilitates connection with vehicles, making the transport of goods more time-saving, labor-saving, and convenient. This resolves issues such as the inability of some handcarts to park securely, potential safety hazards thereby, and incompatibility with trucks or private vehicles during loading, unloading, transferring, or transporting. The above structure thus improves the convenience of the apparatus.

Figure 1:
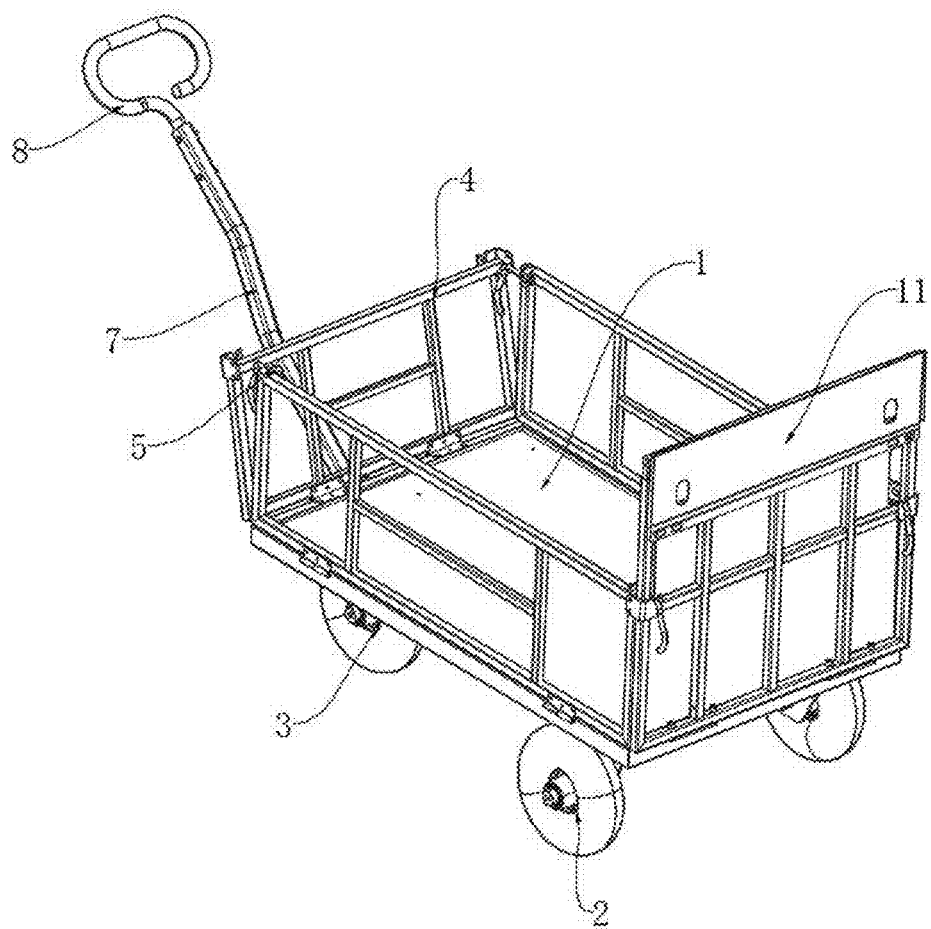
FIG. 1 is a three-dimensional view of a novel multifunctional handcart according to the present disclosure.

Reference Numerals: 1. load platform; 2. rear wheel; 3. front wheel; 4. guardrail; 5. buckle; 6. parking latch; 7. connecting piece; 8. handle; 9. parking base; 10. telescopic rod; 11. lap plate.

DETAILED DESCRIPTION

The technical solutions in the embodiments of the present disclosure will be clearly and completely described below with reference to the accompanying drawings. It is evident that the following embodiments are only a part of the embodiments of the present disclosure, rather than all of them. On the basis of the following, all other embodiments obtained by a person of ordinary skill in the art without exercising any ingenuity shall fall within the scope of the present disclosure.

Figure 2:
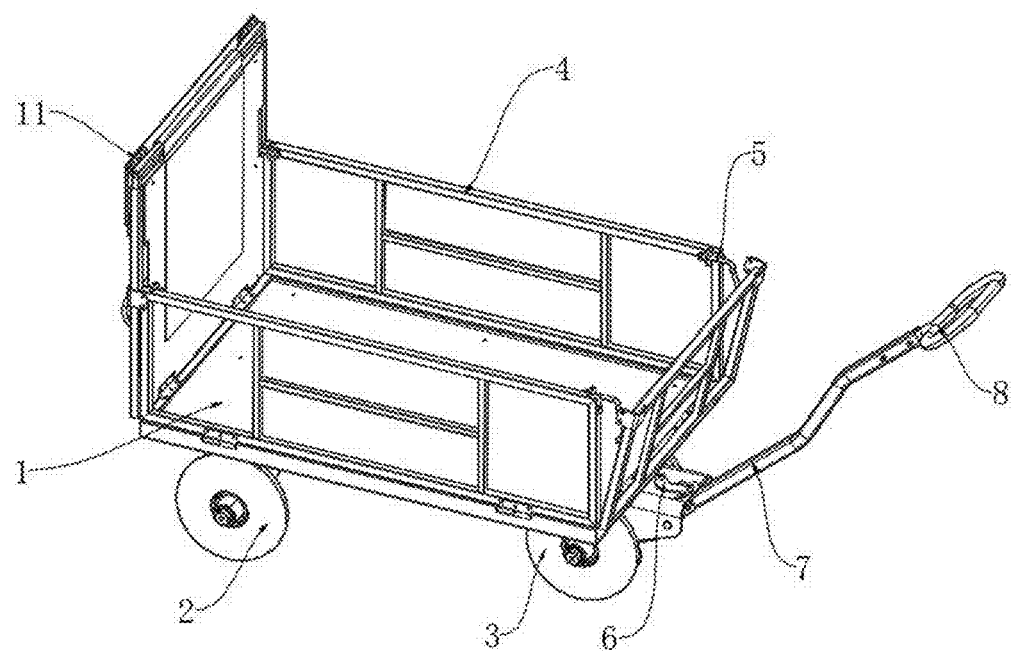
FIG. 2 is a structural diagram of a load platform of a novel multifunctional handcart according to the present disclosure.
Figure 3:
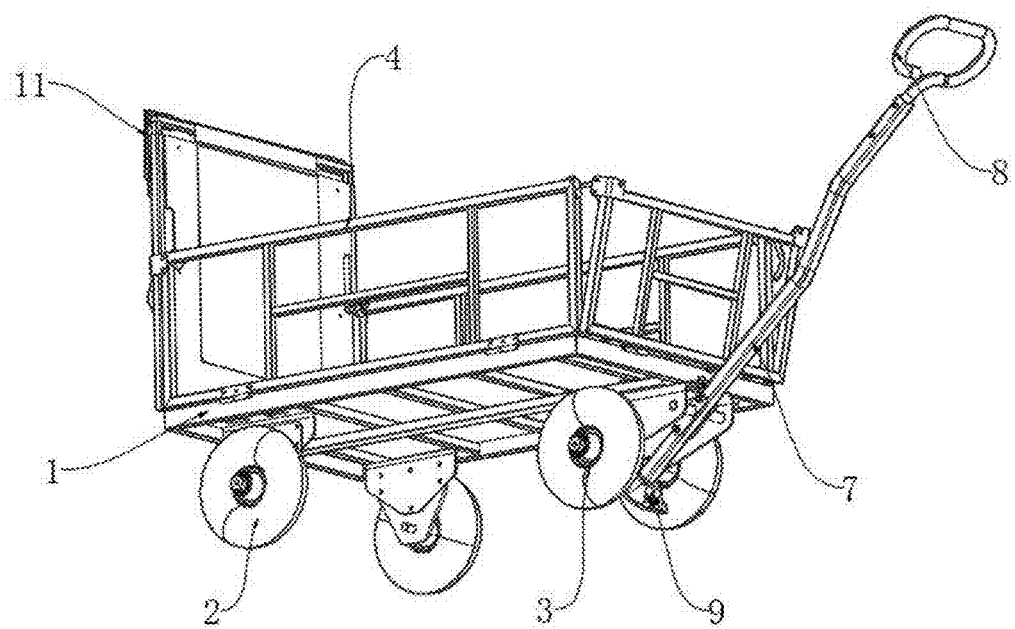
FIG. 3 is a structural diagram of a connecting piece of a novel multifunctional handcart according to the present disclosure.
Figure 4:
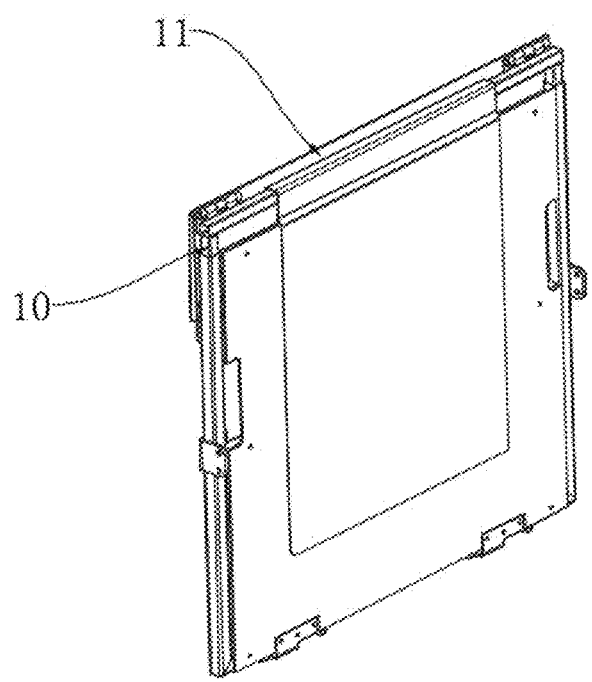
FIG. 4 is a structural diagram of a lap plate of a novel multifunctional handcart according to the present disclosure.

Referring to FIGS. 1-4, an embodiment provided by the present disclosure is as follows. A novel multifunctional handcart comprises a load platform 1. A rear wheel 2 is fixedly connected to the bottom of the load platform 1, and a front wheel 3 is fixedly connected to the bottom of the load platform 1. A guardrail 4 is rotatably connected to a side wall of the load platform 1. The guardrail 4 serves as an enclosure to prevent items on the load platform 1 from falling off during transport. A buckle 5 is provided on a sidewall of the guardrail 4. A parking latch 6 is rotatably connected inside the front wheel 3, and a connecting piece 7 is rotatably connected inside the front wheel 3. A handle 8 is fixedly connected to one end of the connecting piece 7. A parking base 9 is fixedly connected to a lower surface of the connecting piece 7, and the edge of the parking base 9 goes upward to avoid damaging the ground or outdoor lawns. A telescopic rod 10 is provided on a sidewall of the load platform 1, and a lap plate 11 is provided on a sidewall of the telescopic rod 10. The telescopic rod 10 is slidably connected inside a rear guardrail 4, and may be adjusted in length within a certain range to meet the needs for connection at different distances. The lap plate 11 is rotatably connected to a sidewall of the telescopic rod 10. The guardrail 4 is arranged around an edge of the load platform 1 and connected to an adjacent guardrail 4 via a buckle 5. When the parking latch 6 rotates, its inner wall fits against a sidewall of the connecting piece 7 to lock the connecting piece 7 and prevent shaking. The telescopic rod 10 cooperates with the lap plate 11 to connect to an empty space on a vehicle and form a platform, facilitating the handling of objects. The connecting piece 7 is tubular and is configured to connect the handle 8 to the parking base 9.

During assembly, the guardrails 4 need only to be rotated to an appropriate position and connected to adjacent guardrails 4 via buckles 5 to complete the assembling of the four guardrails 4 with the load platform 1. The buckle connection is simple to operate, greatly simplifying the assembly process. Moreover, when the handcart is not in use, reversing the operation of the buckles 5 allows the guardrails 4 to be quickly disassembled, enabling the handcart to be stored in a corner and effectively saving space. When the user grips the handle 8 and applies a pulling force, the connecting piece 7 begins to rotate, transmitting the pulling force to the front wheels 3 and driving them to rotate. In further coordination with the rear wheels 2, the handcart moves, facilitating the transport of items. When parking is required, the user releases the handle 8, causing the parking base 9 fixedly connected to the lower surface of the connecting piece 7 to descend and complete a parking action. The parking base 9 provides support for the handcart during parking, ensuring stability of the cart in a stationary state. Simultaneously, when parking, the user manually rotates the parking latch 6, causing its inner wall to fit against the sidewalls of the connecting piece 7, thereby locking the connecting piece 7 and preventing it from shaking. This ensures the cart remains more stable when stopped, effectively resolving potential safety hazards caused by the parking inability of some handcarts. The load platform 1 is surrounded by guardrails 4 connected via buckles 5. When loading, unloading, transferring or transporting goods from or to a private car or household pickup truck, the telescopic rod 10 is extended from the rear guardrail 4, and the lap plate 11 is rotated to cooperate with the lap plate 11, so as connect to an empty space on a vehicle and form a platform. This allows heavy items to be placed on the platform formed by the lap plate 11 before being moved indoors, significantly improving the efficiency of goods handling and making the handling process more time-saving, labor-saving, and convenient. Through this design, the problem of conventional handcarts being incompatible with trucks or private vehicles for loading, unloading, transferring or transporting purposes is resolved, providing users with convenient transport of heavy items across various scenarios.

WORKING PRINCIPLE

During assembly, the consumer only needs to rotate the guardrails 4 to an appropriate position and connect adjacent guardrails 4 via buckles 5 to complete the assembling of the four guardrails 4 with the load platform 1. When the user grips the handle 8 and applies a pulling force, the connecting piece 7 begins to rotate. Since the connecting piece 7 is rotatably connected inside the front wheels 3, it drives the front wheels 3 to rotate. In coordination with the rear wheels 2, the handcart moves, facilitating the transport of items. When parking is required, the user releases the handle 8, causing the parking base 9 fixedly connected to the lower surface of the connecting piece 7 to descend and complete a parking action. Simultaneously, when parking, the user manually rotates the parking latch 6, causing its inner wall to fit against the sidewalls of the connecting piece 7, thereby locking the connecting piece 7 and preventing it from shaking. This ensures the cart remains more stable when stopped. The load platform 1 is surrounded by guardrails 4 connected via buckle 5. When loading, unloading, transferring or transporting goods from or to a private car or household pickup truck, the telescopic rod 10 is extended from the rear guardrail 4, and the lap plate 11 is rotated to cooperate with the lap plate 11, so as connect to an empty space on a vehicle and form a platform. This allows heavy items to be placed on the platform formed by the lap plate 11 before being moved indoors, significantly improving the efficiency of goods handling and making the handling process more time-saving, labor-saving, and convenient.

Finally, it should be noted that the above are only preferred embodiments of the present disclosure, and should not be construed as limitations thereto. Although the present disclosure has been described in detail with reference to the foregoing embodiments, those skilled in the art may still make modifications to the technical solutions described above or make equivalent substitutions for certain technical features. Any modifications, equivalent substitutions, or improvements made within the spirit and scope of the present disclosure shall fall within its protection scope.

What is claimed is:

1. A novel multifunctional handcart, comprising a load platform (1), wherein a rear wheel (2) is fixedly connected to the bottom of the load platform (1), wherein a front wheel (3) is fixedly connected to the bottom of the load platform (1), wherein a guardrail (4) is rotatably connected to a side wall of the load platform (1), wherein a buckle (5) is provided on a sidewall of the guardrail (4), wherein a parking latch (6) is rotatably connected inside the front wheel (3), wherein a connecting piece (7) is rotatably connected inside the front wheel (3), wherein a handle (8) is fixedly connected to one end of the connecting piece (7), wherein a parking base (9) is fixedly connected to a lower surface of the connecting piece (7), wherein a telescopic rod (10) is provided on a sidewall of the load platform (1), and wherein a lap plate (11) is provided on a sidewall of the telescopic rod (10).

2. The novel multifunctional handcart according to claim 1, wherein the telescopic rod (10) is slidably connected inside the rear guardrail (4), and wherein the lap plate (11) is rotatably connected to the side wall of the telescopic rod (10).

3. The novel multifunctional handcart according to claim 1, wherein the guardrail (4) is arranged around an edge of the load platform (1) and connected to an adjacent guardrail (4) via a buckle (5).

4. The novel multifunctional handcart according to claim 1, wherein when the parking latch (6) rotates, its inner wall fits against a side wall of the connecting piece (7), thereby locking the connecting piece (7) and preventing shaking.

5. The novel multifunctional handcart according to claim 1, wherein the telescopic rod (10) cooperates with the lap plate (11) to connect to an empty space on a vehicle and form a platform, facilitating the handling of objects.

6. The novel multifunctional handcart according to claim 2, wherein the connecting piece (7) is tubular and is configured to connect the handle (8) and the parking base (9).

\* \* \* \* \*